(12) United States Patent
Anand et al.

(10) Patent No.: US 11,847,405 B1
(45) Date of Patent: Dec. 19, 2023

(54) ENCODING HYPERLINK DATA IN A PRINTED DOCUMENT

(71) Applicant: Microsoft Technology Licensing, LLC, Redmond, WA (US)

(72) Inventors: Mohit Anand, New Delhi (IN); Abhas Sinha, Hyderabad (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/844,399

(22) Filed: Jun. 20, 2022

(51) Int. Cl.
*G06F 40/134* (2020.01)
*G06F 40/205* (2020.01)
*G06F 3/12* (2006.01)
*G06F 40/166* (2020.01)

(52) U.S. Cl.
CPC .......... *G06F 40/134* (2020.01); *G06F 3/1203* (2013.01); *G06F 3/1238* (2013.01); *G06F 40/166* (2020.01); *G06F 40/205* (2020.01)

(58) Field of Classification Search
CPC ..... G06F 40/134; G06F 40/166; G06F 40/205
See application file for complete search history.

(56) References Cited

U.S. PATENT DOCUMENTS

| | | | |
|---|---|---|---|
| 5,438,630 A | 8/1995 | Chen et al. | |
| 5,781,914 A * | 7/1998 | Stork | H04N 1/32133 |
| | | | 715/234 |
| 5,832,530 A | 11/1998 | Paknad et al. | |
| 6,199,071 B1 * | 3/2001 | Nielsen | G06F 16/9558 |
| | | | 707/999.005 |
| 6,537,324 B1 * | 3/2003 | Tabata | G06F 40/169 |
| | | | 715/205 |
| 7,275,206 B1 * | 9/2007 | Bates | G06F 40/134 |
| | | | 715/205 |
| 8,127,219 B1 * | 2/2012 | Gupta | G06F 40/169 |
| | | | 715/208 |
| 8,179,556 B2 | 5/2012 | Salgado et al. | |
| 8,341,104 B2 | 12/2012 | Manickam et al. | |
| 8,659,787 B2 | 2/2014 | Kamijoh et al. | |
| 9,785,619 B1 * | 10/2017 | Hill | G06F 16/9574 |

(Continued)

FOREIGN PATENT DOCUMENTS

EP   2386977 A1 * 11/2011   ......... G06F 16/5846

OTHER PUBLICATIONS

Bergman, et al., "DocWizards: A System for Authoring Follow-me Documentation Wizards", In Proceedings of the 18th Annual ACM Symposium on User Interface Software and Technology, Oct. 23, 2005, pp. 191-200.

(Continued)

*Primary Examiner* — Asher D Kells
(74) *Attorney, Agent, or Firm* — Schwegman Lundberg & Woessner, P.A.

(57) ABSTRACT

A method may include receiving a request from a software application to print an electronic document; in response to the request, parsing the electronic document; based on the parsing, detecting a text element in a portion of the electronic document that is associated in a structure of the electronic document with a network link, the network link being different than the text element; modifying the portion of the electronic document with the text element to include a printable element encoded with the network link; and transmitting the electronic document as modified to a printer driver.

18 Claims, 5 Drawing Sheets

(56) References Cited

U.S. PATENT DOCUMENTS

| | | | |
|---|---|---|---|
| 9,785,849 B2 | 10/2017 | Cimpoi et al. | |
| 10,044,793 B2* | 8/2018 | Itogawa | H04L 67/10 |
| 10,331,769 B1* | 6/2019 | Hill | G06F 40/134 |
| 10,346,515 B2* | 7/2019 | Kaliarajan | G06F 3/1206 |
| 10,922,475 B2* | 2/2021 | Waran | G06F 40/134 |
| 2006/0028689 A1 | 2/2006 | Perry et al. | |
| 2007/0019222 A1 | 1/2007 | Oda et al. | |
| 2007/0189579 A1* | 8/2007 | Crookham | G06V 10/462 |
| | | | 382/100 |
| 2008/0180700 A1* | 7/2008 | Miyata | G06F 40/134 |
| | | | 358/1.6 |
| 2012/0037695 A1* | 2/2012 | Liu | G06F 16/9554 |
| | | | 235/494 |
| 2013/0117644 A1* | 5/2013 | Dhawan | G06F 40/134 |
| | | | 715/205 |
| 2015/0154157 A1* | 6/2015 | Itogawa | G06F 16/9554 |
| | | | 715/205 |
| 2016/0155034 A1* | 6/2016 | Williams | H04L 67/01 |
| | | | 235/494 |
| 2017/0041494 A1* | 2/2017 | Fernandes | G06F 3/1285 |
| 2018/0314675 A1* | 11/2018 | Kaliarajan | G06F 3/1206 |
| 2019/0102368 A1* | 4/2019 | Waran | G06V 10/22 |

OTHER PUBLICATIONS

Hecht, Davidl. , "Embedded Data Glyph Technology for Hardcopy Digital Documents", In Proceedings of SPIE—The International Society for Optical Engineering, vol. 2171, Feb. 7, 1994, pp. 341-352.

"International Search Report and Written Opinion issued in PCT Application No. PCT/US23/021809", dated Aug. 3, 2023, 15 Pages.

* cited by examiner

ENCODING HYPERLINK DATA IN A PRINTED DOCUMENT

BACKGROUND

When a user creates an electronic document, they may want to indicate where additional information may be found, such as at a webpage. Because Uniform Resource Locators (URL) of a webpage or a file location are often lengthy and potentially incomprehensible, the link may represented in the document using alternative text. For example, a user may write "Further information may be found here" with the underlining of "here" indicating that a user may click on the word and be taken to the link location.

Given that most documents are consumed on electronic devices, there is no loss of information by not spelling out the URL and instead including an activatable link. However, if a user chooses to print a document, the word "here" will still be the word that is printed out with no indication of the underlying web page linked by the author.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

In the following description, for purposes of explanation, numerous specific details are set forth in order to provide a thorough understanding of some example embodiments. It will be evident, however, to one skilled in the art that the present invention may be practiced without these specific details.

Throughout this disclosure, electronic actions may be taken by components in response to different variable values (e.g., thresholds, user preferences, etc.). As a matter of convenience, this disclosure does not always detail where the variables are stored or how they are retrieved. In such instances, it may be assumed that the variables are stored on a storage device (e.g., RAM, cache, hard drive) accessible by the component via an API or other program communication method. Similarly, the variables may be assumed to have default values should a specific value not be described. User interfaces may be provided for an end-user or administrator to edit the variable values in some instances.

In various examples described herein, user interfaces are described as being presented to a computing device. Presentation may include transmitting data (e.g., a hypertext markup language file) from a first device (such as a web server) to the computing device for rendering on a display device of the computing device via a rendering engine such as a web browser. Presenting may separately (or in addition to the previous data transmission) include an application (e.g., a stand-alone application) on the computing device generating and rendering the user interface on a display device of the computing device without receiving data from a server.

Furthermore, the user interfaces are often described as having different portions or elements. Although in some examples these portions may be displayed on a screen at the same time, in other examples the portions/elements may be displayed on separate screens such that not all of the portions/elements are displayed simultaneously. Unless indicated as such, the use of "presenting a user interface" does not infer either one of these options.

Additionally, the elements and portions are sometimes described as being configured for a certain purpose. For example, an input element may be described as being configured to receive an input string. In this context, "configured to" may mean presentation of a user interface element that is capable of receiving user input. Thus, the input element may be an empty text box or a drop-down menu, among others. "Configured to" may additionally mean computer executable code processes interactions with the element/portion based on an event handler. Thus, a "search" button element may be configured to pass text received in the input element to a search routine that formats and executes a structured query language (SQL) query with respect to a database.

Many authors add hyperlinks/encoded files in their digital documents (resume, books, research papers, business cards) which work well on digital devices as the receiver may click on the link to navigate to the intended resource. The same scenario is broken when the digital artifact (e.g., the text element of the link) is printed because the printing service ignores the underling link and prints the text element.

This scenario creates at least two technical problems. First, when the hyperlink is not used in the document itself, and instead text such as "Click here" is used, the reader is unable able to view the underlying data (link/file location). This results in a technical problem of data loss when printed. Additionally, it presents particular problems for users that rely on accessibility reading devices, which cannot access the underlying link. Second, even if the full hyperlink is typed out in the document, a user may have to manually type the data into their web browsers. This process is both very inefficient and prone to errors when a hyperlink is particularly long. Thus, the encoded data is human readable but not machine interpretable. This second problem is a technical problem related to the inability of devices to interpret printed text as a hyperlink.

As a solution to the above problems, system and methods are described herein to represent the hyperlink data in a printed artifact that makes a link both human readable and machine interpretable. Two methods are described. The first uses masking of the 'text to display' with a pattern in which the pattern contains the encoded data, which can be scanned using a quick response code or other camera application. The second creates a bounding box around the 'text to display' region in which the code in the white space is encoded with the data. In this method, the contrast of the printed pattern may have a lower contrast so as to not detract from the legibility of text when printed. Both of the above technical solutions result in a printed document that maintains its formatting (e.g., the location of the words do not change) and prevents information loss when printing.

Additionally, the below discussion focuses on printing to physical media (e.g., paper), but the encoding process may be used in other instances as well. For example, the output may be a PDF file or used in a webpage to allow a user taking a quick picture/screenshot of the webpage to still be able to obtain any underlying link data.

Figure 1:
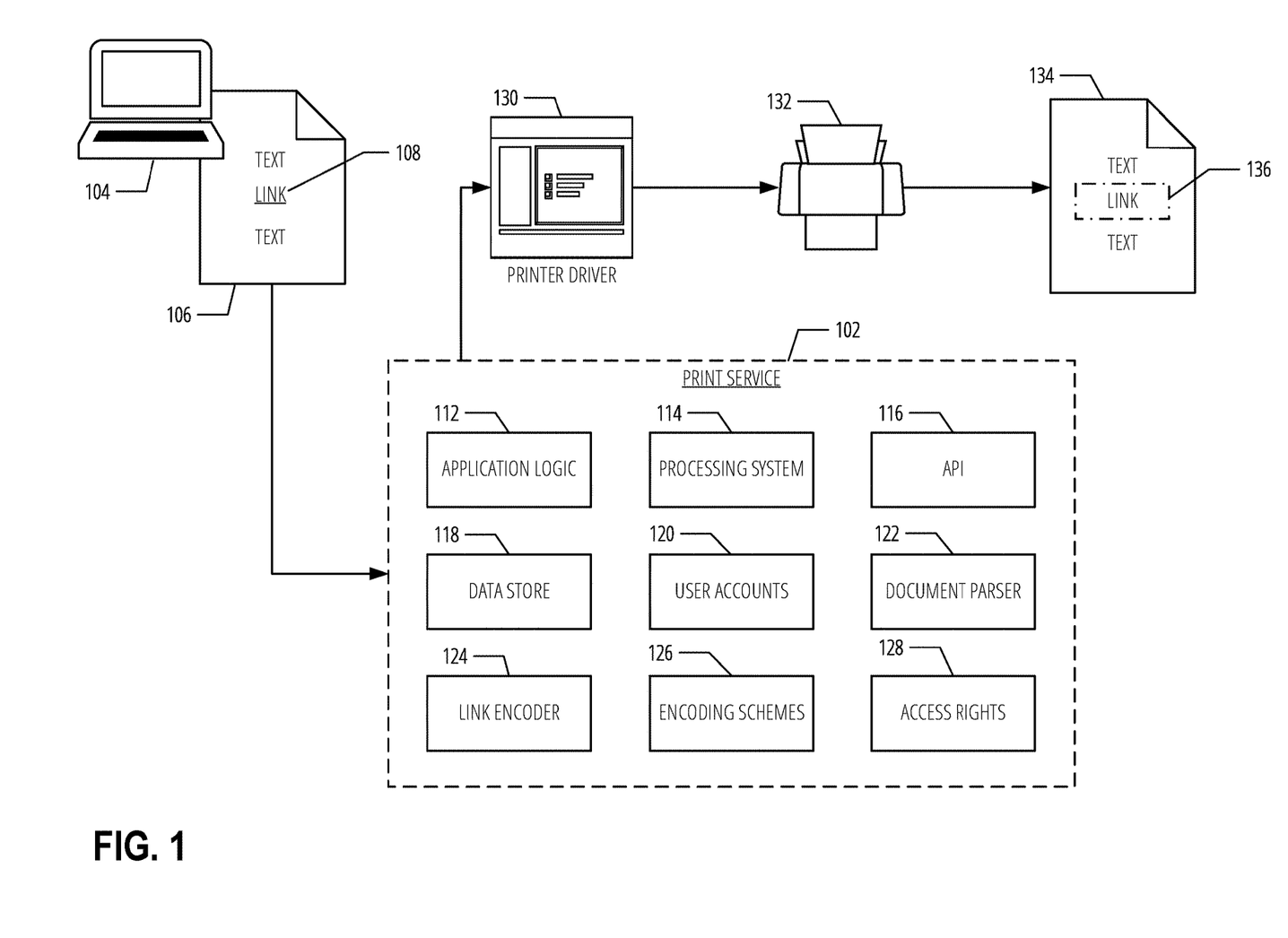
FIG. 1 is a schematic diagram of components associated with a print service, according to various examples.

FIG. 1 is a schematic diagram of components associated with a print service, according to various examples. FIG. 1 includes print service 102, client device 104, original electronic document 106, text element 108, application logic 112, processing system 114, API 116, data store 118, user accounts 120, document parser 122, link encoder 124, encoding schemes 126, access rights 128, printer driver 130, printer 132, printed document 134, and encoded graphical element 136.

Print service 102 is illustrated as set of separate elements (e.g., component, logic, etc.). However, the functionality of multiple, individual elements may be performed by a single element. An element may represent computer program code that is executable by processing system 114. The program code may be stored on a storage device (e.g., data store 118) and loaded into a memory of the processing system 114 for execution. Portions of the program code may be executed in a parallel across multiple processing units (e.g., a core of a general purpose computer processor, a graphical processing unit, an application specific integrated circuit, etc.) of processing system 114. Execution of the code may be performed on a single device or distributed across multiple devices. In some examples, the program code may be executed on a cloud platform (e.g., MICROSOFT AZURE® and AMAZON EC2®) using shared computing infrastructure.

Client device 104 may be a computing device which may be, but is not limited to, a smartphone, tablet, laptop, multi-processor system, microprocessor-based or programmable consumer electronics, game console, set-top box, or other device that a user utilizes to communicate over a network. In various examples, a computing device includes a display module (not shown) to display information (e.g., in the form of specially configured user interfaces). In some embodiments, computing devices may comprise one or more of a touch screen, camera, keyboard, microphone, or Global Positioning System (GPS) device.

A user may create an electronic document using an application installed on client device 104, such as a word processing application. In other examples, a user may create an electronic document using a web-based application. In some examples, a user may create the electronic document using the installed application and edit the same document using a web-based version of the application.

As part of the electronic document creating process, a user may link a text element (e.g., one or more words) to a network location. The network location may be a website, file path, email address, in various examples. The characters of text element may not match the network location. For example, the application may implement a feature in which a user may link the text element to the network location but use the text element as the displayed content.

In various example, the electronic document adheres to a standardized data schema through use of a markup language such as extensible markup language (XML). Accordingly, the editing application may present the text element, but the underlying electronic document may store additional information such as formatting, network links, etc. For example, consider that a user has written "my link" and linked it to Wikipedia. If a plain text editor were to display a portion of electronic document, an entry may such the below may appear:

<w:hyperlink r:id="rId5" w:history="1">
<w:r w:rsidR="00AA1899" w:rsidRPr="00AA1899">
<w:rPr><w:rStyle w:val="Hyperlink"/></w:rPr>
<w:t>my link</w:t></w:r></w:hyperlink>

As seen in above text, there is a "hyperlink" with an "r:id" of "rId5" that is associated with the text "my link". Elsewhere in the electronic document an entry such as the below may appear:

Target="http://www.wikipedia.org/"
TargetMode="External"/><Relationship Id="rId5"

In this case, the same "rId5" identifier appears that indicates the value of the "Target" is the underlying network link that is associated with the text element "my link." Accordingly, as discussed in further detail below, document parser 122 may iterate through a document to identify text elements that are associated with a network link (e.g., using tags), and by using a reference identifier, determine the associated network link. In instances where a link is written out, there may not be a "hyperlink" entry. In these instances, regular expressions or other text pattern matching techniques may be used to identify the links. (e.g., any text beginning with http://).

Original electronic document 106 represents a document with text element 108 before any modifications by print service 102. After processing by print service 102, a modified version of the document may be passed to printer driver 130 for formatting the document into a printer description language understood by printer 132 for printing of printed document 134. As seen printed document 134 now includes encoded graphical element 136, which when viewed by a code reader, may instruct a web browser to open up the underlying network link.

If print service 102 is not operating locally on client device 104, client device 104 and print service 102 may communicate via a network (not shown). The network may include local-area networks (LAN), wide-area networks (WAN), wireless networks (e.g., 802.11 or cellular network), the Public Switched Telephone Network (PSTN) Network, ad hoc networks, cellular, personal area networks or peer-to-peer (e.g., Bluetooth®, Wi-Fi Direct), or other combinations or permutations of network protocols and network types. The network may include a single Local Area Network (LAN) or Wide-Area Network (WAN), or combinations of LAN's or WAN's, such as the Internet.

In some examples, the communication may occur using an application programming interface (API) such as API 116. An API provides a method for computing processes to exchange data. A web-based API (e.g., API 116) may permit communications between two or more computing devices such as a client and a server. The API may define a set of HTTP calls according to Representational State Transfer (RESTful) practices. For examples, A RESTful API may define various GET, PUT, POST, DELETE methods to create, replace, update, and delete data stored in a database (e.g., data store 118).

For example, API 116 may take as input a document identifier and a Bool value signifying that a the document tied to the document identifier should be modified to include a printable element encoded with network link data. User preferences may also be included as elements of the API call.

Print service 102 may include a web server (not shown) to enable data exchanges with client device 104 when print service 102 is operating remotely from print service 102.

Although generally discussed in the context of delivering webpages via the Hypertext Transfer Protocol (HTTP), other network protocols may be utilized by web server 110 (e.g., File Transfer Protocol, Telnet, Secure Shell, etc.). A user may enter in a uniform resource identifier (URI) into web client 106 (e.g., the INTERNET EXPLORER® web browser by Microsoft Corporation or SAFARI® web browser by Apple Inc.) that corresponds to the logical location (e.g., an Internet Protocol address) of web server 110. In response, web server 110 may transmit a web page that is rendered on a display device of a client device (e.g., a mobile phone, desktop computer, etc.).

Additionally, web server 110 may enable a user to interact with one or more web applications provided in a transmitted web page. A web application may provide user interface (UI) components that are rendered on a display device of client device 104. The user may interact (e.g., select, move, enter text into) with the UI components, and, based on the interaction, the web application may update one or more portions of the web page. A web application may be executed in whole, or in part, locally on client device 104. The web application may populate the UI components with data from external sources or internal sources (e.g., data store 118) in various examples. For example, the web application may include options to set default print preferences, change print permissions, etc.

Print service 102 may be implemented according to application logic 112. Application logic 112 may use the various elements of print service 102 to implement the document modification. For example, application logic 112 may issue API calls to retrieve or store data from data store 118 and transmit it for display on client device 104. Similarly, data entered by a user into a UI component may be transmitted using API 116 back to a web server. Application logic 112 may use other elements (e.g., document parser 122, link encoder 124, encoding schemes 126, etc.) of print service 102 to perform functionality as described further herein.

Data store 118 may store data that is used by print service 102. Data store 118 is depicted as singular element, but may in actuality be multiple data stores. The specific storage layout and model used in by data store 118 may take a number of forms—indeed, a data store 118 may utilize multiple models. Data store 118 may be, but is not limited to, a relational database (e.g., SQL), non-relational database (NoSQL) a flat file database, object model, document details model, graph database, shared ledger (e.g., blockchain), or a file system hierarchy. Data store 118 may store data on one or more storage devices (e.g., a hard disk, random access memory (RAM), etc.). The storage devices may be in standalone arrays, part of one or more servers, and may be located in one or more geographic areas.

User accounts 120 may include user profiles on users of print service 102. A user profile may include credential information such as a username and hash of a password. A user may enter in their username and plaintext password to a login page of print service 102 to view their user profile information or interfaces presented by print service 102 in, various examples.

A user account may also include preferences of the user. The preferences may include changing access rights with respect to encoded links. For example, a user may indicate that only certain people—as identified by an identifier such as an email address—may print the document with underlying links encoded as printable elements. Other preferences may include a default setting with respect to encoding such as using a letter mask or a bounding box—or if by default no modifications should occur.

Print service 102 may be invoked in a number of manners such as using a drop-down menu, a shortcut key combination, clicking a toolbar, etc. In various examples, print service 102 augments an existing print service of an application to add the printable element described herein. For example, the addition of a printable element with an encoded link may be performed automatically with no additional user input needed. In other examples, a user may select an option in a printing dialog user interface to have the printable element added.

Regardless of the way print service 102 was invoked, document parser 122 may parse the document that is to be printed to determine if network links have been associated with any text elements in the electronic document. As part of the parsing process, document parser 122 may iterate through the document for tags within the structure of the document that indicate a hyperlink. These tags may not be visible to the user when editing the document. For example, there may be a tag with a label of "hyperlink", and within text of that tag there may be a reference identification.

Document parser 122 may then use the reference identification to obtain the link from another portion of the document in which the reference identification is used. In various examples, if a text element and its associated network link are the same, the text element is not further processed. Thus, a printable element encoded with the network link is not added to the electronic document in these instances. In other examples, hyperlink text is treated the same as a text element such that the characters of the hyperlink or an added bounding box are encoded with the hyperlink location.

For each text element that has been associated with a network link, link encoder 124 may generate a printable graphical element that encodes the associated network link according to an encoding scheme selected from encoding schemes 126. The process of encoding a link is further discussed in the context of FIG. 2 and FIG. 3.

Access rights 128 may store permission information on which user accounts are authorized to print using the added printable elements. The permission information may set at a document level, a user level, or a domain/company level, according to various examples. For example, one company may not permit the addition of the printable elements, whereas another company may allow a subset of their employees to use the printable elements. Before document parser 122 begins, access rights 128 may be queried with the requesting user's user identifier (e.g., an email address) to determine if the user has the correct permissions to add the printable elements.

In some examples, the access rights are stored as metadata associated with the document. For example, a user creating the document may identify certain users that are able to print the document using the encoding process described herein. Then, even if there is no communication path to access rights 128, a printing service may check the metadata and user identifier of the user who is printing to determine if the printing user is on the identified list.

In various examples, access rights 128 may also define which encoding scheme to use. For example, some encoding schemes may include an encryption level as well to prevent any unauthorized users from being able to decode the printable element using a code reader. For example, the text may be encrypted using asymmetric encryption techniques (e.g., public key infrastructure) or symmetric encryption (e.g., using a single private key). As with permissions above, encoding schemes may be set at a document, user, or domain level.

Figure 2:
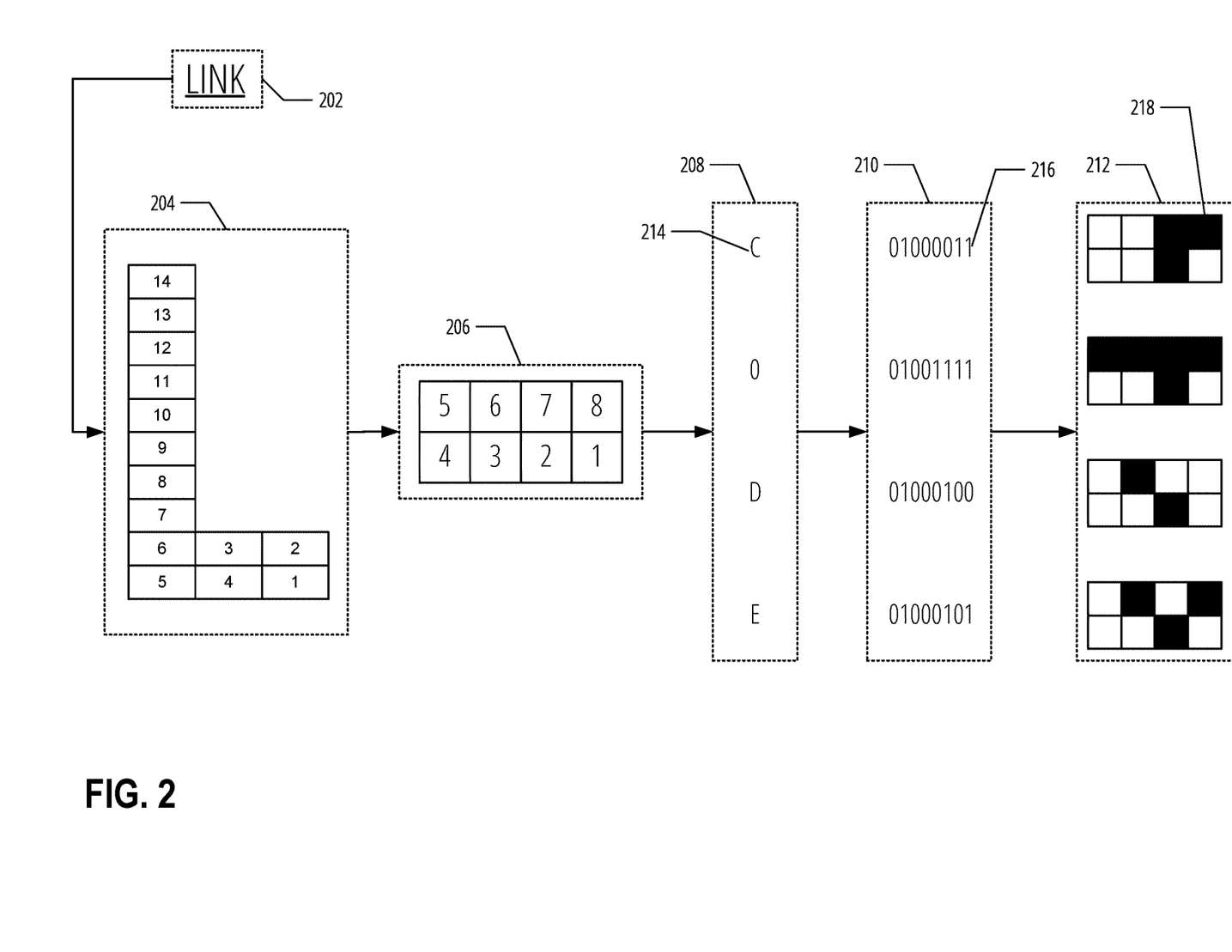
FIG. 2 is an illustration of encoding a character with link data, according to various examples.

FIG. 2 is an illustration of encoding a character with link data, according to various examples. FIG. 2 includes text element 202, letter segmentations 204, encoding pattern 206, network link characters 208, binary representations 210, graphical bit representations 212, link character 214, binary representation 216, and graphical bit representation 218.

As indicated above, the network link associated with a text element may be encoded in several ways using an encoding scheme from encoding schemes 126. FIG. 2 illustrates a manner of using the text element as a template for encoding the network link by segmenting one or more of the characters into a plurality of segments. An encoding scheme may store the location and sequence number for characters (capitalized and lowercase) that may make up a text element.

With respect to FIG. 2, the text element 202 is "LINK." Accordingly, segmentation for the letters 'L', 'I', 'N', and 'K' may be retrieved from the encoding scheme. FIG. 2 includes an example of segmentations of the character 'L'. The sequence, location, and size of letter segmentations 204 are an example, and others may be used. As illustrated, letter segmentations 204 has 16 segments with the first segment of the sequence being in the lower right portion. Accordingly, the first character that is to be encoded will be placed in the location sequence number 1, then the second character will use the second location, etc.

Encoding pattern 206 identifies the location and sequence of each bit of a binary encoding. In this case, encoding pattern 206 is for eight bits. As with letter segmentations 204, the order, shape, and number of bits in encoding pattern 206 are an example and others may be used.

Network link characters 208 represent a portion of a link that may be associated with text element 202. For illustration purposes, the word "CODE" is being used, but complete URLs will likely be used in most cases. Accordingly, in this instance only four segments of letter segmentations 204 are needed to complete the encoding, but longer network links may use all 16 segments and continue to use segments of the other letters (e.g., 'I'). Furthermore, although not described, additional information may be encoded in letter segmentations 204. For example, error correction bits, an end of message block, total character count, etc., may be used to speed up processing and ensure more robust decoding if a print is not clear.

Binary representations 210 are character encodings of each letter of the network link in binary representation. The character encoding may be separate from the encoding schemes in encoding schemes 126. For example, the American Standard Code for Information Interchange (ASCII) character encoding may be used. Graphical bit representations 212 may result from using the binary representations 210 and encoding pattern 206. In the illustrated case, a black portion indicates a value of '1' in the binary representation and a value of '0' is white.

For example, link character 214 is a 'C'. A capital C in ASCII has a value of 67 in decimal form. 67 is represented as 01000011 in binary form (e.g., binary representation 216). The first digit of binary representation 216 is a zero. Accordingly, the first block of the sequence in encoding pattern 206 may remain white. The second digital of binary representation 216 is a one. Thus, the second block of encoding pattern 206 is black, and so on.

In various examples, encoding schemes 126 maps characters to graphical bit representation. When a network link is being encoded, the graphical bit representation corresponding to a character of the network link may be retrieved from encoding schemes 126—as opposed to generating the representation dynamically when requested.

To decode an encoded network link, the reverse of the process in FIG. 2 may be used. For example, an image of a printed document may be analyzed by a decoder application running on a client device. The analysis may include using a computer vision process that looks for characters in which letters of a printed document are dissimilar to the others. For example, because the graphical bit representations have white and black space, a letter will inherently look different (e.g., be lighter in color due to the loss of certain printed portions) than one that is printed without the graphical bit representations. In other examples, orientation markers may be used in an outline around the encoded text as discussed in FIG. 3. Then, using an encoding scheme from encoding schemes 126, the characters may be segmented, and each graphical bit representation may be read in sequence and converted back to the encoded network link.

Figure 3:
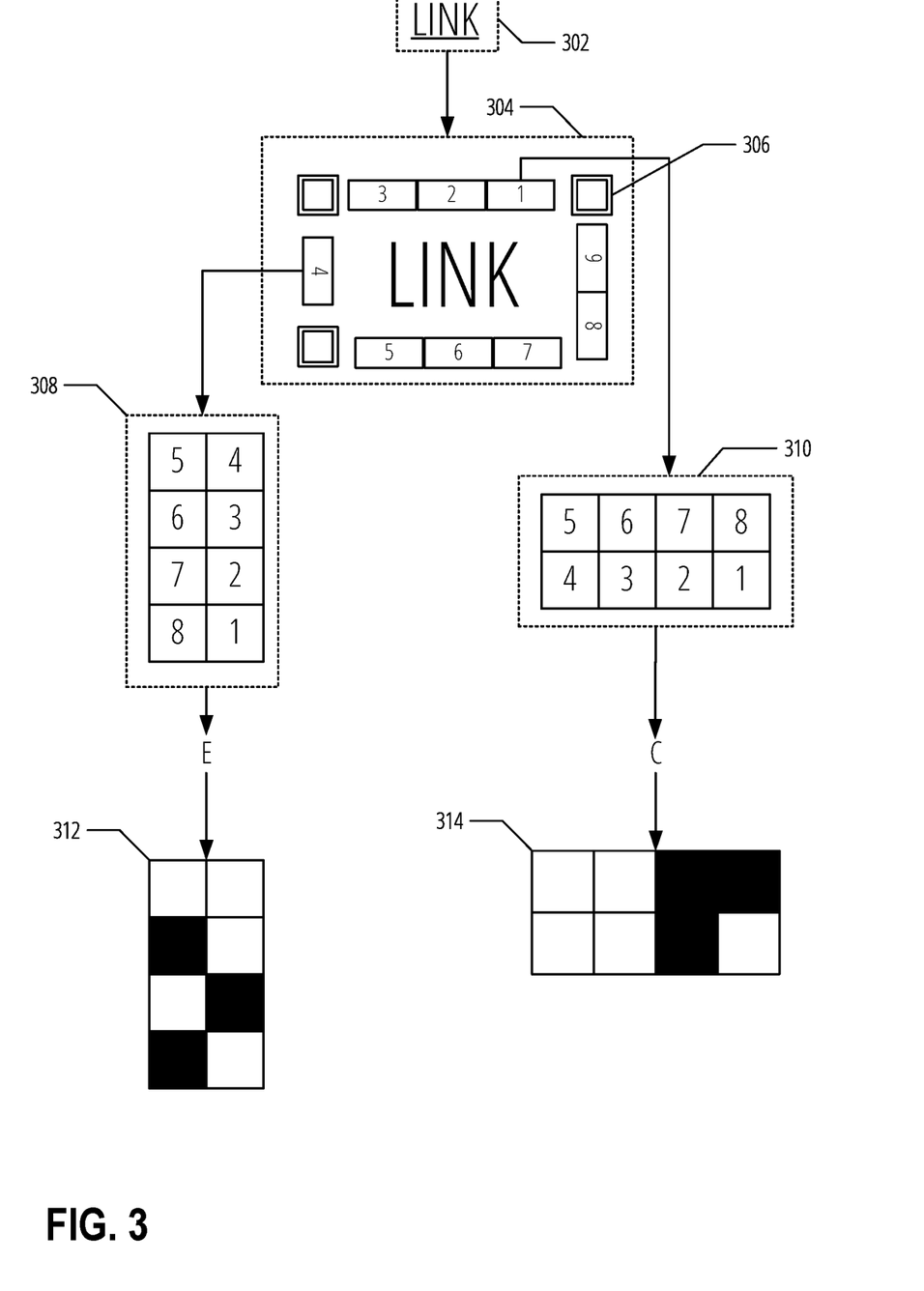
FIG. 3 is an illustration of encoding a bounding box with link data, according to various examples.

FIG. 3 is an illustration of encoding a bounding box with link data, according to various examples. FIG. 3 includes text element 302, bounding box representation 304, orientation marker 306, encoding pattern 308, encoding pattern 310, graphical bit representation 312, and graphical bit representation 314.

In contrast to segmenting characters of the text element as in FIG. 2, white space surrounding the text element is segmented in an outline. As seen in bounding box representation 304, there are nine segments. Additionally, there are three orientation markers, such as orientation marker 306. The orientation markers may be used by the decoder application to determine the bounds of the bounding box. Orientation markers may also be used when encoding the network link into the text elements to allow the decoder application to find the bounds of the encoded text more quickly.

Although not required, encoding patterns may be created in a number of orientations. For example, encoding pattern 308 is oriented vertically whereas encoding pattern 310 is oriented horizontally. The vertical orientation encoding bit patterns may be used on the left and right sides of bounding box representation 304, and the horizontal encoding patterns may be used on the top and bottom.

Graphical bit representation 312 may be generated in a similar manner as the graphical bit representations of FIG. 2. For example, assuming the same network link of "CODE," the 4th letter is 'E', which corresponds with segment 4 of bounding box representation 304. Accordingly, a vertical pattern (such as encoding pattern 308), may take the ASCII value 'E' (69) and apply encoding pattern 308 to generate graphical bit representation 312. With respect to segment 1 of bounding box representation 304, encoding pattern 310 may be used for the 'C' to generate graphical bit representation 314.

Figure 4:
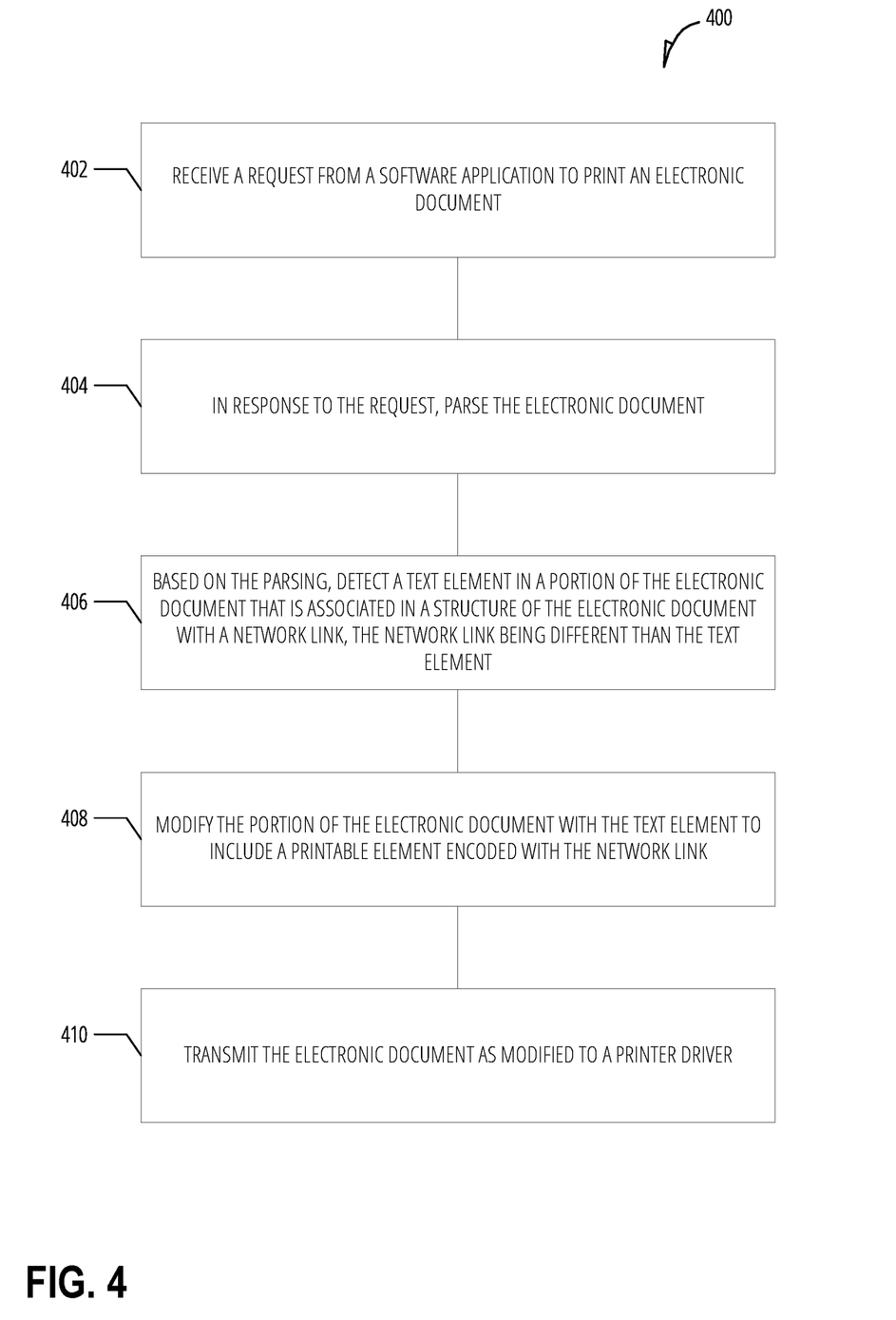
FIG. 4 is an illustration of a method of modifying an electronic document, according to various examples.

FIG. 4 is an illustration of a method of modifying an electronic document, according to various examples. The method is represented as a set of blocks that describe operation 402 to operation 410 of flowchart 400. The method may be embodied in a set of instructions stored in at least one computer-readable storage device of a computing device(s). A computer-readable storage device excludes transitory signals. In contrast, a signal-bearing medium may include such transitory signals. A machine-readable medium may be a computer-readable storage device or a signal-bearing medium. The computing device(s) may have one or more processors that execute the set of instructions to configure the one or more processors to perform the operations illustrated in FIG. 4. The one or more processors may instruct other component of the computing device(s) to carry out the set of instructions. For example, the computing device may instruct a network device to transmit data to another computing device or the computing device may provide data over a display interface to present a user interface. In some examples, performance of the method may be split across multiple computing devices using a shared computing infrastructure.

In various examples, operation 402 of method 400 includes receiving a request from a software application to print an electronic document. For example, the request may be received from a printing service such as print service 102. The software application may be a word processing application.

In various examples, operation 404 of method 400 includes in response to the request, parsing the electronic document. The parsing may be performed using a parser such as document parser 122. Parsing may include iterating through the underlying file structure of the electronic document and not just text visible to a user when using the software application.

In various examples, before the parsing, method 400 may include determining that a user associated with the request has permission to modify the portion of the electronic document associated with the text element based on permission metadata of the electronic document.

In various examples, operation 406 of method 400 includes based on the parsing, detecting a text element in a portion of the electronic document that is associated in a structure of the electronic document with a network link. In some examples, the network link is different than the text element. Detecting may include finding a tag that signifies a hyperlink.

In various examples, operation 408 of method 400 includes modifying the portion of the electronic document with the text element to include a printable element encoded with the network link. For example, an encoding scheme that maps characters to a graphical bit representation may be retrieved. The encoding scheme may be retrieved from encoding schemes 126. Generating the printable element may include encoding the network link using the encoding scheme. Encoding may be performed using link encoder 124.

In various examples, the modifying is performed automatically in response to receiving the request whereas in other examples the modifying is performed in response to receiving a selection of a presented user interface element option to modify the electronic document.

In various examples, as part of the received request formatting preferences for the modifying may be received. and the portion of the electronic document associated with the text element may be modified in accordance with the request. For example, a formatting preference may indicate to use a bounding box vs an encoded text element. The preference may also indicate a level of contrast to use for the bounding box. For example, the printable element may be formatted at a lower contrast level than the text element.

The printable element may be added to the electronic document by adding the printable element as an outline (e.g., a bounding box) surrounding the text element. Portions (e.g., segments) of the outline may be encoded with character data corresponding to character data of the network link. An example of an outline surrounding the text element is discussed in the context of FIG. 3.

In various examples, the text element may be removed and replaced with the printable element. The printable element may be an encoded text element in which portions of characters of the encoded text element are encoded with character data corresponding to character data of the network link. An example of an encoded text element is discussed in FIG. 2.

In various examples, modifying the portion of the electronic document with the text element to include the printable element encoded with the network link preserves placement of other text elements in the electronic document. Accordingly, in various examples, a portion may be defined as the text element and white space surrounding the text element. Thus, modifying the portion of the electronic document may not introduce additional spacing or alter the location or size of the non-linked text elements.

In various examples, retrieving may include selecting the encoding scheme from a plurality of encoding schemes based on a preference received as part of the request. For example, the request may be associated with a user identifier and the preferences of the user identifier may indicate a specific encoding scheme to use due to the user identifier being part of a company domain.

In various examples, operation 410 of method 400 includes transmitting the electronic document as modified to a printer driver. The printer driver may translate the modified electronic document into a printer description language before printing the electronic document.

Embodiments described herein may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

Examples, as described herein, may include, or may operate on, logic or a number of components, modules, or mechanisms. Modules may be hardware, software, or firmware communicatively coupled to one or more processors in order to carry out the operations described herein. Modules may hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium.

In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Figure 5:
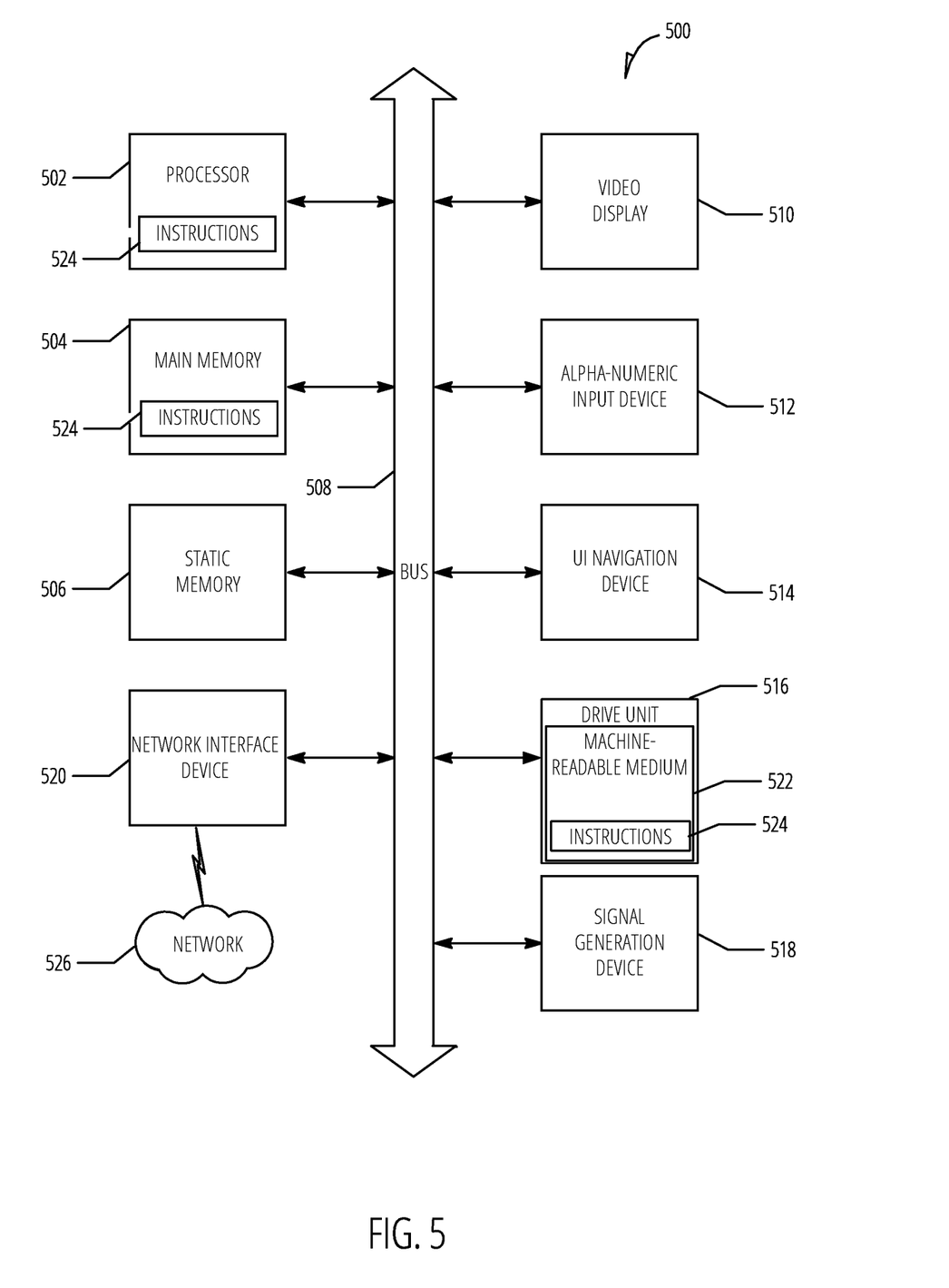
FIG. 5 is a block diagram illustrating an example machine upon which any one or more of the techniques (e.g., methodologies) discussed herein may be performed, according to an example embodiment.

FIG. 5 is a block diagram illustrating a machine in the example form of a computer system 500, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be an onboard vehicle system, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 500 includes at least one processor 502 (e.g., a central processing unit (CPU), a graphics processing unit (GPU) or both, processor cores, compute nodes, etc.), a main memory 504 and a static memory 506, which communicate with each other via a link 508 (e.g., bus). The computer system 500 may further include a video display unit 510, an input device 512 (e.g., a keyboard), and a user interface (UI) navigation device 514 (e.g., a mouse). In one embodiment, the video display unit 510, input device 512 and UI navigation device 514 are incorporated into a touch screen display. The computer system 500 may additionally include a storage device 516 (e.g., a drive unit), a signal generation device 518 (e.g., a speaker), a network interface device 520, and one or more sensors (not shown), such as a global positioning system (GPS) sensor, compass, accelerometer, or other sensor.

The storage device 516 includes a machine-readable medium 522 on which is stored one or more sets of data structures and instructions 524 (e.g., software) embodying or utilized by any one or more of the methodologies or functions described herein. The instructions 524 may also reside, completely or at least partially, within the main memory 504, static memory 506, and/or within the processor 502 during execution thereof by the computer system 500, with the main memory 504, static memory 506, and the at least one processor 502 also constituting machine-readable media.

While the machine-readable medium 522 is illustrated in an example embodiment to be a single medium, the term "machine-readable medium" may include a single medium or multiple media (e.g., a centralized or distributed database, and/or associated caches and servers) that store the instructions 524. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, 4G LTE/LTE-A or WiMAX networks, and 5G). The term "transmission medium" shall be taken to include any intangible medium that is capable of storing, encoding, or carrying instructions for execution by the machine, and includes digital or analog communications signals or other intangible medium to facilitate communication of such software.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

What is claimed is:

1. A system comprising:
   at least one processor; and
   a storage device comprising instructions, which when executed by the at least one processor, configure to the at least one processor to perform operations comprising:
   receiving a request from a software application to print an electronic document;
   in response to the request, parsing the electronic document;
   based on the parsing, detecting a text element in a portion of the electronic document that is associated in a structure of the electronic document with a network link, the network link being different than the text element;

retrieving an encoding scheme that maps alphanumeric characters to a graphical bit representation; and generating a printable element encoded with the network link using the encoding scheme;

modifying the portion of the electronic document with the text element to include the printable element encoded with the network link; and transmitting the electronic document as modified to a printer driver.

2. The system of claim 1, wherein the operation of retrieving the encoding scheme includes:

selecting the encoding scheme from a plurality of encoding schemes based on a preference received as part of the request.

3. The system of claim 1, wherein the operation of modifying the portion of the electronic document includes:

adding the printable element as an outline surrounding the text element.

4. The system of claim 3, wherein portions of the outline are encoded with character data corresponding to character data of the network link.

5. The system of claim 1, wherein the storage device further comprises instructions, which when executed by the at least one processor, configure the at least one processor to perform operations comprising:

removing the text element; and wherein the printable element encoded with the network link is an encoded text element in which portions of characters of the encoded text element are encoded with character data corresponding to character data of the network link.

6. The system of claim 1, wherein the storage device further comprises instructions, which when executed by the at least one processor, configure the at least one processor to perform operations comprising:

before the parsing, determining that a user associated with the request has permission to modify the portion of the electronic document associated with the text element based on permission metadata of the electronic document.

7. The system of claim 1, wherein the storage device further comprises instructions, which when executed by the at least one processor, configure the at least one processor to perform operations comprising:

as part of the request, receiving formatting preferences for the modifying; and modifying the portion of the electronic document associated with the text element in accordance with the request.

8. The system of claim 1, wherein the modifying is performed automatically in response to receiving the request.

9. The system of claim 1, wherein the modifying is performed in response to receiving a selection of a presented user interface element option to modify the electronic document.

10. The system of claim 1, wherein the printable element is formatted at a lower contrast level than the text element.

11. The system of claim 1, wherein modifying the portion of the electronic document with the text element to include the printable element encoded with the network link preserves placement of other text elements in the electronic document.

12. A computer-implemented method comprising:

receiving a request from a software application to print an electronic document;

in response to the request, parsing the electronic document;

based on the parsing, detecting a text element in a portion of the electronic document that is associated in a structure of the electronic document with a network link, the network link being different than the text element;

retrieving an encoding scheme that maps alphanumeric characters to a graphical bit representation;

generating the printable element encoded with the network link using the encoding scheme;

modifying the portion of the electronic document with the text element to include the printable element encoded with the network link; and transmitting the electronic document as modified to a printer driver.

13. The computer-implemented method of claim 12, wherein retrieving the encoding scheme includes:

selecting the encoding scheme from a plurality of encoding schemes based on a preference received as part of the request.

14. The computer-implemented method of claim 12, wherein modifying the portion of the electronic document includes:

adding the printable element as an outline surrounding the text element.

15. The computer-implemented method of claim 14, wherein portions of the outline are encoded with character data corresponding to character data of the network link.

16. The computer-implemented method of claim 12, further comprising: removing the text element; and wherein the printable element encoded with the network link is an encoded text element in which portions of characters of the encoded text element are encoded with character data corresponding to character data of the network link.

17. The computer-implemented method of claim 12, further comprising:

before the parsing, determining that a user associated with the request has permission to modify the portion of the electronic document associated with the text element based on permission metadata of the electronic document.

18. A non-transitory memory storage device comprising instructions, which when executed by at least one processor, configure the at least one processor to perform operations comprising:

receiving a request from a software application to print an electronic document;

in response to the request, parsing the electronic document;

based on the parsing, detecting a text element in a portion of the electronic document that is associated in a structure of the electronic document with a network link, the network link being different than the text element;

retrieving an encoding scheme that maps alphanumeric characters to a graphical bit representation;

generating the printable element encoded with the network link using the encoding scheme;

modifying the portion of the electronic document with the text element to include the printable element encoded with the network link; and transmitting the electronic document as modified to a printer driver.

* * * * *